(No Model.)                    G. C. JANNEY.                    4 Sheets—Sheet 3.
                               CORN PLANTER.
No. 535,800.                                    Patented Mar. 12, 1895.
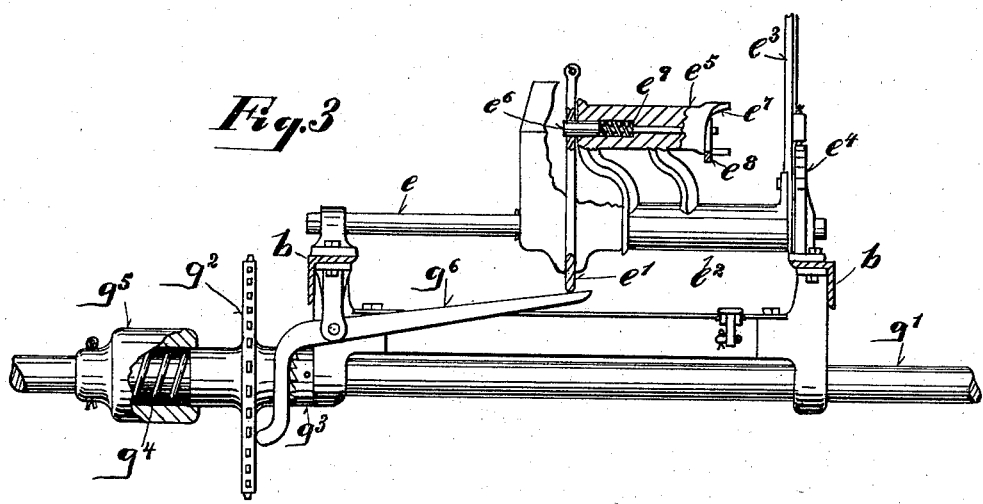
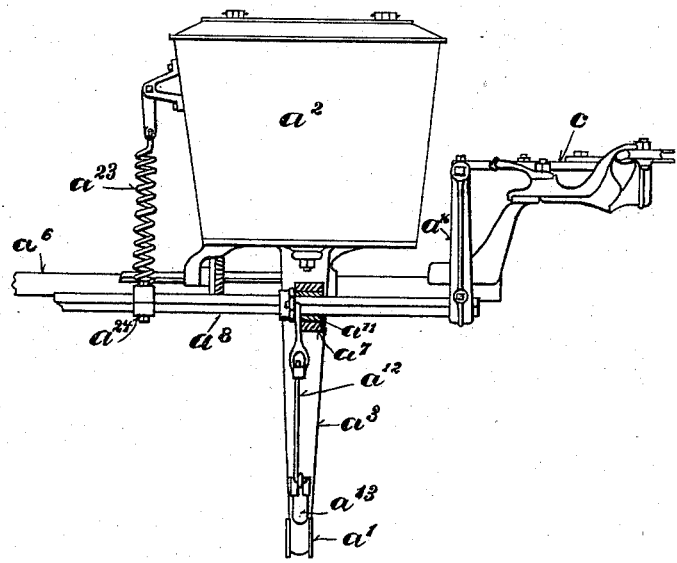
WITNESSES:                                          INVENTOR
Fred Ernest                                       George C. Janney
Franklbatt                                        BY
                                                     ATTORNEYS

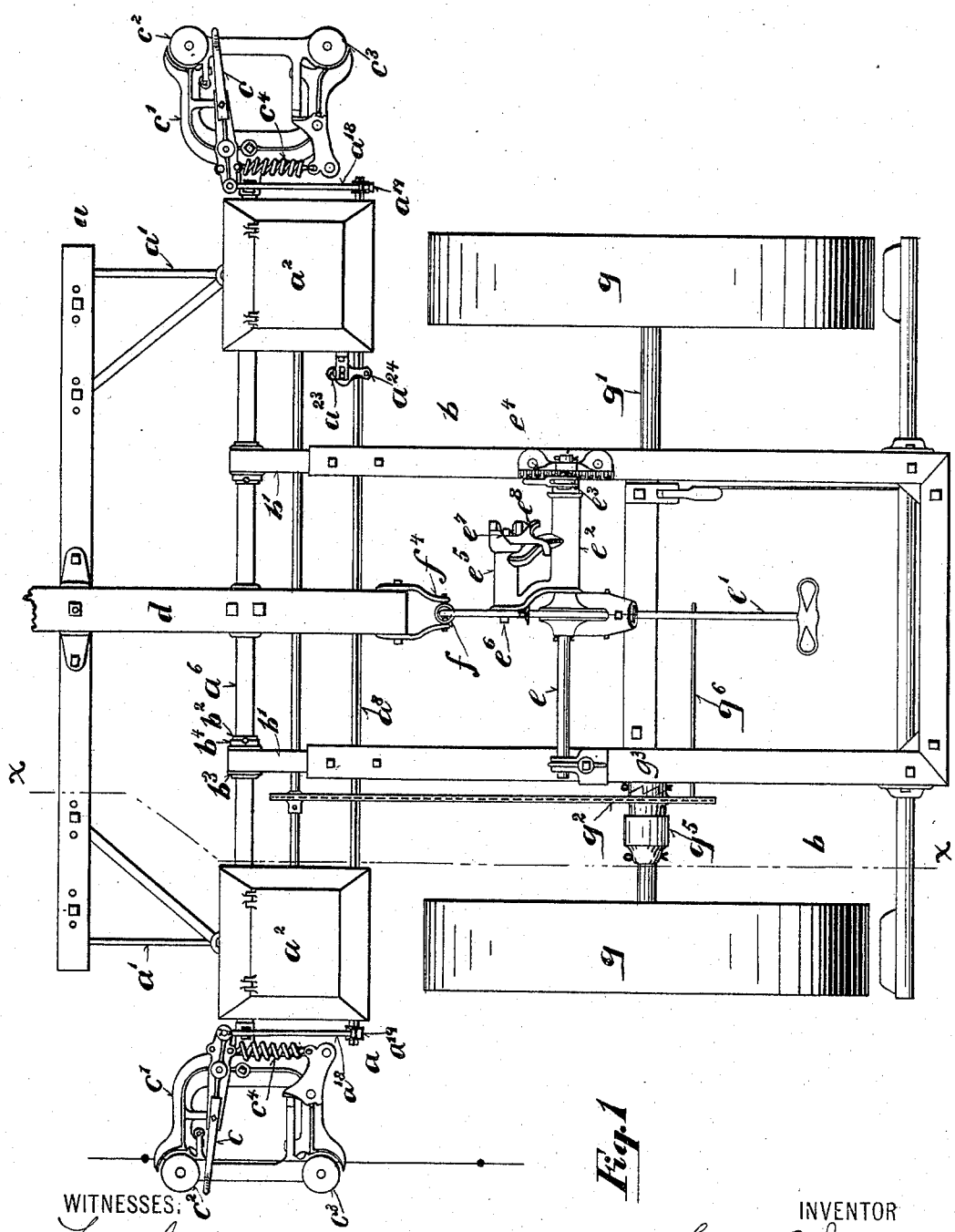

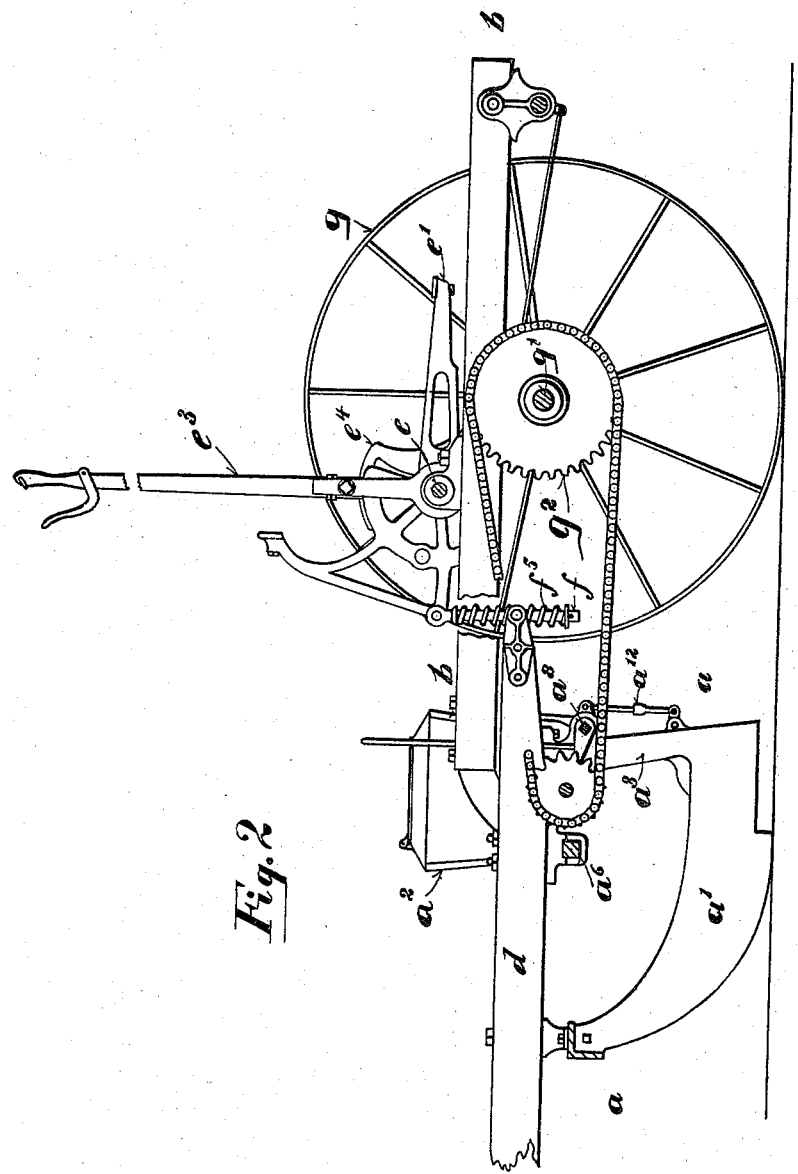

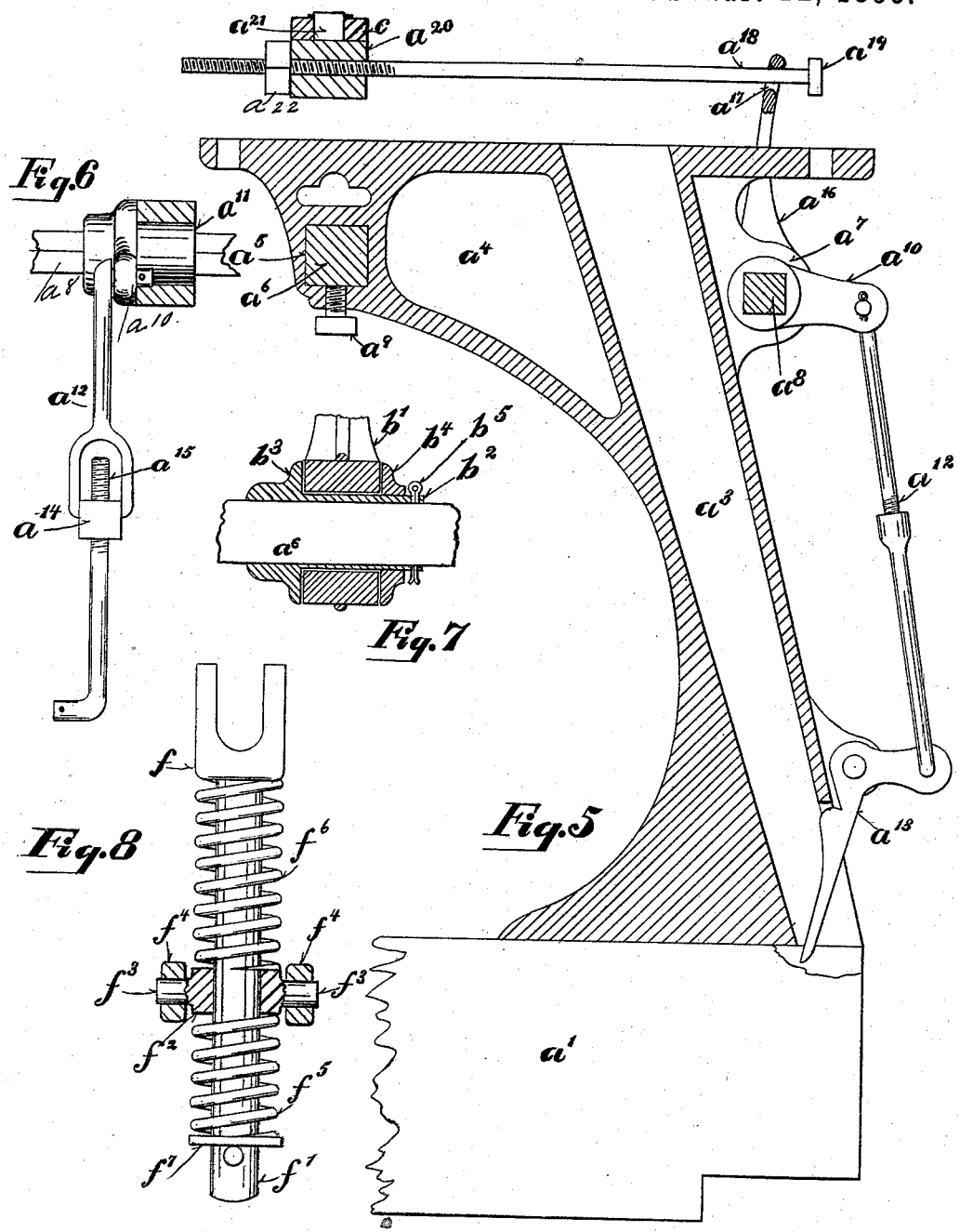

UNITED STATES PATENT OFFICE.

GEORGE C. JANNEY, OF MUNCIE, INDIANA.

CORN-PLANTER.

SPECIFICATION forming part of Letters Patent No. 535,800, dated March 12, 1895.

Application filed June 17, 1893. Serial No. 477,903. (No model.)

*To all whom it may concern:*

Be it known that I, GEORGE C. JANNEY, a citizen of the United States, residing at Muncie, in the county of Delaware and State of Indiana, have invented a certain new and useful Improvement in Corn-Planters, of which the following is a specification.

My invention relates to improvements in corn planters; and the object of my invention is to improve upon the constructions of corn planters now in use, with a view to simplifying the same, both in the operation as well as in the construction, so as to increase the effectiveness of the machine as a completed machine, and to decrease the cost of production. I attain these objects by the constructions shown in the accompanying drawings, in which—

Figure 1 is a plan view of a machine embodying my invention. Fig. 2 is a side elevation of the same partly in section; the section being taken on the line as represented at X X in Fig. 1. Fig. 3 is a detail view illustrating a portion of the raising and lowering devices, together with the connections for disengaging the driving mechanism. Fig. 4 is a rear view of a portion of the planter frame. Fig. 5 is an enlarged detail of a portion of one of the planting shoes and the valve connections. Fig. 6 is a detail of an adjustable valve link. Fig. 7 is a detail view in section of one of the frame hinges. Fig. 8 is a detail view partly in section of the spring connection between the respective planter parts.

Like parts are represented by similar letters of reference in the several views.

In the said drawings $a\ a$, represent the runner frame, and $b, b,$ the wheel frame. The runner frame is formed in the usual way with the shoes $a'$, and the seed boxes $a^2$, arranged above the shoes; the seed tubes $a^3$, being employed in the usual manner for conducting the grain from the seed boxes to the shoes. The seed tubes $a^3$, are cored or otherwise formed in a stand or bracket $a^4$, which is enlarged at the top to receive and support the seed boxes. These brackets or stands $a^4$, are each provided at the front and near the top with a bearing $a^5$, formed integral therewith and provided with a square opening adapted to receive a connecting bar or shaft $a^6$, also formed square in cross section. These brackets or stands are further provided at the rear with a bearing $a^7$, in which is journaled a shaft $a^8$, in the manner hereinafter more fully described. The cross bar $a^6$, extends from one bracket $a^4$, to the other, passes through the respective bearings $a^5$, in said brackets and projects outwardly in opposite directions therefrom. This bar furnishes the means of connecting the respective seed devices and also constitutes the support for various operating parts and connections, as hereinafter more fully described. Each of the bearings $a^5$, is provided with a set-screw $a^9$ by means of which the brackets or stands $a^4$, may be connected to the said bar and held firmly against lateral movement thereon in any desired position of adjustment. The shaft $a^8$, is also preferably formed square in cross section, and has located thereon near each seed tube a projecting arm $a^{10}$, provided with an extended hub $a^{11}$, which is formed to fit in the bearing $a^7$, and turn therein, thus furnishing the journals for the square shaft $a^8$. From the respective arms $a^{10}$, a connecting link $a^{12}$, leads to a pivoted valve $a^{13}$ arranged at or near the bottom of the seed tube $a^3$. This link $a^{12}$, is made in two parts, one of said parts being provided with a perforated bearing $a^{14}$, and the other part having a screw-threaded portion $a^{15}$, adapted to screw into said bearing, thus furnishing the means for shortening or lengthening the said link, as desired. The shaft $a^8$, is further provided at or near each end with a projecting arm or lever $a^{16}$, perforated near the top with an opening $a^{17}$, to receive a rod $a^{18}$, having at one end a head $a^{19}$, and screw-threaded at its opposite end and adapted to screw into a sleeve $a^{20}$, having a projecting trunnion $a^{21}$, which is journaled in the end of a pivoted forked vibrating lever $c$, arranged horizontally on a frame $c'$, which carries the pulleys $c^2$, $c^3$, for the check wire, which is adapted to operate the said forked lever $c$, in the usual manner. A lock nut $a^{22}$, is preferably employed on the rod $a^{18}$, to hold said rod in different positions of adjustment through the sleeve $a^{20}$, as desired. The rod $a^{18}$, works loosely through the opening $a^{17}$; the head $a^{19}$, on said rod contacting with the arm $a^{16}$, when the rod is moved in one direction; the said arm being capable of an independent movement in relation to said rod in the other direction. A movement of the vibrating lever $c$, operates the rod $a^{18}$, causes the head $a^{19}$, to contact with the arm $a^{16}$, and thus locks the shaft $a^8$, so as to open the valves $a^{13}$. The valves, however, are closed independently of the movement of the forked lever $c$, preferably by means of a spring $a^{23}$, attached to the shaft $a^8$, by means of a projecting arm $a^{24}$; said spring being connected at its opposite end to some convenient stationary part of the machine. The vibrating forked levers $c$, are returned to their normal position after each stroke by a spring $c^4$, in the usual manner. The arrangement, as described, of the connections from the vibrating forked levers to the valve $a^{13}$, permits said valves to be moved independent of the forked vibrating levers, when desired, without disconnecting the forked levers. This connection also permits either one of the vibrating levers $c$, to operate the valves independently of the other vibrating lever.

Difficulty has been experienced in machines of this character in the uniform opening and closing of the valves $a^{13}$, owing to the fact that in operation the valves, by reason of wear or for other causes, become deranged in their relative adjustment with reference to the shaft $a^8$. In my machine this difficulty is readily overcome by shortening or lengthening the respective links $a^{12}$, thus bringing the said valves into uniform adjustment with the said shaft, so as to cause them to open and close simultaneously. The wheel frame $b, b$, is preferably formed of angle iron and is hinged directly to the cross bar $a^6$, by means of projecting arms or brackets $b'$. These arms or brackets $b'$, are perforated at their outer extremities and adapted to receive sleeves or trunnions $b^2$, which fit over said shaft $a^6$, and are provided at one end with shoulders $b^3$, and at the other with a collar $b^4$; the said brackets $b'$, being adapted to turn on said sleeve between the shoulder $b^3$, and the collar $b^4$; the parts being held in their respective positions on the shaft $a^6$, by a pin or cotter $b^5$, which extends through the end of said sleeve and through said shaft. (See Fig. 7 for detail.)

The tongue $d$, is secured to the runner frame $a, a$, and projects backwardly beyond the hinged connection between said runner frame and wheel frame. On the wheel frame is a transverse shaft $e$, on which is journaled a foot lever $e'$ which projects on opposite sides of said shaft $e$, and is connected to the tongue in the manner hereinafter more fully specified. Arranged adjacent to the foot lever $e'$, is a sleeve $e^2$, having connected thereto a lifting lever $e^3$, provided with the usual thumb-latch or spring catch, adapted to operate in connection with a ratchet stand $e^4$, to hold said lever in different positions of adjustment. This sleeve $e^2$, is further provided with an extended bracket $e^5$, which is formed at its outer end into a bearing to receive a pin $e^6$, adapted to engage in an opening in the foot lever $e'$, and thus connect said lever and sleeve. The bracket $e^5$, is constructed at one end with a cam-shaped portion $e^7$, which operates in connection with a lever $e^8$, on the end of said pin $e^6$, to produce a longitudinal movement of said pin, when the lever is turned thereon; a spring $e^9$, being adapted to force said pin outwardly to cause it to engage with the foot lever, when the cam lever $e^8$, is turned to its normal position. Means are thus provided by which the sleeve $e^2$, together with the hand lever $e^3$, may be connected to or disconnected from the foot lever $e'$, so that either or both may be used in adjusting the runner frame with reference to the wheel frame, to change the depth of planting or for other well known purposes.

It is desirable that means be provided for affording a yielding pressure between the raising and lowering devices of the wheel frame and the runner frame, and that this yielding pressure be exerted in both directions; that is to say, both on the up and down movement of the lifting devices in connection with the runner frame. To accomplish this I employ a link $f$, preferably bifurcated at its upper end to connect to the foot lever $e'$. This link is shouldered down below the bifurcated portion to form a stem $f'$, on which is journaled a collar $f^2$, having on opposite sides thereof projecting trunnions $f^3$, journaled in projecting arms $f^4$, on each side of and projecting to the rear of the tongue $d$. On opposite sides of this collar $f^2$, are placed springs $f^5, f^6$; a washer or collar $f^7$, being arranged at the lower end of the stem $f'$, to support the lower end of the spring $f^5$. The springs $f^5, f^6$, it will be seen, are thus adapted to furnish a yielding movement to the link $f$, in either direction, and thus furnish a yielding connection between the foot lever and the tongue, which will cause a yielding pressure to be exerted to the runner frame, either up or down, when operated by the lifting devices. This connection also permits a limited yielding movement of the runner frame in either direction, when the lifting devices are held in any position of adjustment by the lifting lever and ratchet stand, as described.

The runner frame, it will be seen, is supported and carried in the usual manner on carrying wheels $g$, secured to the main axle $g'$, which turns in suitable bearings on said frame and carries a sprocket wheel or other suitable driving gear $g^2$, for operating the upper dropping devices of the planter, which may be of any suitable and well known form, constituting no part of this invention. To provide for automatically disengaging the driving mechanism, and thus stop the dropping of the grain when the shoes are elevated from the ground, I construct the driving gear $g^2$, with a clutch face, adapted to engage with a clutch collar $g^3$, mounted on the shaft or axle $g'$, so as to turn therewith; the gear $g^2$, being mounted loosely on said shaft so as to turn therewith only when in engagement with said clutch; a spring $g^4$, arranged in a spring cup $g^5$, on said axle, being adapted to press said gear into engagement with said clutch. Pivoted to the frame $b, b$, is a curved bell crank lever $g^6$, one end of which is adapted to bear against the central web or other portion of the gear $g^2$, the opposite end being extended to a point in the path of the foot lever $e'$, so that when said foot lever is depressed to a point which will elevate the planting shoes out of the planting position, said foot lever contacts with the bell crank lever $g^6$, and thus produces a lateral movement of the driving gear $g^2$, sufficient to disengage it from the clutch $g^3$, and thus allow the axle to turn independent of said gear, so long as the parts remain in this position.

It will be seen that as above described I provide a planter which is extremely simple, both in operation and in construction, the parts of which are capable of ready adjustment to suit the work to be performed thereby, and may be readily mounted or dismounted for repairs or otherwise.

It should be noted that the heads or frames $c'$, which carry the forked lever $c$, and constituting what is generally known as the check heads, are mounted directly on the bar $a^6$, being bolted or otherwise fastened directly thereto. This arrangement, together with the constructions before described, permits the parts to be readily assembled. By loosening the set-screws and pin on said bar, said bar may be removed from the machine or replaced as desired. This is also true of the rock shaft $a^8$, the parts being adapted to be assembled together with little machine work, and the constructions being such that they may be readily assembled or replaced, as desired.

Having thus described my invention, I claim—

1. The combination with the planting shoes having the bracket stands and the seed tubes therein, seed boxes supported on said stands, a transverse bar extending through said bracket stands, and bearings in said bracket stands to receive said bar, a rock shaft also journaled in said bracket stands, and check heads on said bar having reciprocating levers connected to said rock shaft, valves on said bracket stands arranged to open and close said tubes, a connection from said rock shaft to said valves, a set-screw in said bracket bearings for holding the bracket stands against side movement on said bar, substantially as specified.

2. The combination with the shoes having the bracket stands with the seed tubes therein, the seed boxes supported on said stands, each of said stands being provided with a bearing at the front and rear, as described, a transverse bar passing through the front bearings on said bracket stands, and a rock shaft passing through the rear bearings thereon, valves operated from said rock shaft, to open and close said seed tubes set screws in said front bearings for holding said bracket stands against side movement on said bar, and link connections from said rock shaft to said valves, substantially as specified.

3. In a corn planter, the planting shoes having the seed tubes and valves, a rock shaft for operating said valves, projecting arms on said rock shaft, and a two part link connection extending from each of said arms to each of said valves, each of said parts of said link being provided at one end with a trunnion to pivotally connect with the respective arms, and one of said parts being provided at the opposite end with an internally screw-threaded sleeved portion, and the other portion provided with an externally screw-threaded portion adapted to fit into said sleeved portion, whereby said valves may be adjusted independent of each other, substantially as specified.

4. In a planter having a runner frame and a wheel frame, a tongue connected to said runner frame and extending backwardly therefrom, a lifting device on said wheel frame, and a connection from said lifting device to said tongue, said connection consisting essentially of a perforated collar having laterally projecting trunnions adapted to fit in bearings on said tongue, a link projecting through said collar and having at opposite ends shoulders or projections between which and said collar are included springs which hold said collar normally at a point substantially midway of said link but permit it to yield in opposite directions therefrom, substantially as specified.

5. In a planter, a spring coupling between the runner frame and the wheel frame, said coupling consisting essentially of a link, bifurcated at one end and adapted to pass through a perforated collar having on its outer periphery oppositely projecting trunnions, and springs on opposite sides of said collar and included between said collar and projections on the respective ends of said link, and supporting bearings for the trunnions of said collar, substantially as specified.

6. The combination with the lifting lever, the main axle, the driving gear on said axle, the clutch on said axle adapted to engage said driving gear, the pivoted bell crank lever adapted to bear against one side of said gear, and a spring on the opposite side of said driving gear, said bell crank lever being extended into the path of said lifting lever so as to be operated thereby when said lifting lever is moved to a predetermined point, substantially as specified.

GEORGE C. JANNEY.

In presence of—
WM. W. ORR,
R. R. JANNEY.